US010533728B2

(12) United States Patent
Yamauchi

(10) Patent No.: US 10,533,728 B2
(45) Date of Patent: Jan. 14, 2020

(54) LIGHTING DEVICE

(71) Applicant: PANASONIC INTELLECTUAL PROPERTY MANAGEMENT CO., LTD., Osaka (JP)

(72) Inventor: Kentaro Yamauchi, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 254 days.

(21) Appl. No.: 15/682,684

(22) Filed: Aug. 22, 2017

(65) Prior Publication Data
US 2018/0059474 A1 Mar. 1, 2018

(30) Foreign Application Priority Data

Aug. 30, 2016 (JP) .................. 2016-168606

(51) Int. Cl.
| | | |
|---|---|---|
| F21V 9/02 | (2018.01) | |
| G02F 1/1335 | (2006.01) | |
| G09F 19/18 | (2006.01) | |
| G02F 1/13 | (2006.01) | |
| G03B 21/00 | (2006.01) | |

(52) U.S. Cl.
CPC .................. *F21V 9/02* (2013.01); *G02F 1/13* (2013.01); *G02F 1/133514* (2013.01); *G09F 19/18* (2013.01); *G03B 21/001* (2013.01)

(58) Field of Classification Search
CPC . F21V 9/02; F21V 3/0615; F21V 3/08; F21V 3/0625; F21V 11/08; F21V 7/06; F21V 7/0041; F21V 7/0008; F21V 3/10; G02F 1/133514; G02F 1/13; G09F 19/18; G03B 21/001; G03B 21/14; G02B 6/0011; E06B 7/28; E04B 9/32; F21S 8/02;
(Continued)

(56) References Cited

U.S. PATENT DOCUMENTS 6,877,882 B1* 4/2005 Haven .................. H04N 9/315
348/E9.027
2002/0186221 A1 12/2002 Bell
(Continued)

FOREIGN PATENT DOCUMENTS

| JP | 2004-341446 | 12/2004 |
|---|---|---|
| JP | 2007-514241 | 5/2007 |

(Continued)

*Primary Examiner* — Cara E Rakowski
*Assistant Examiner* — Danell L Owens
(74) *Attorney, Agent, or Firm* — Greenblum & Bernstein, P.L.C.

(57) ABSTRACT

A lighting device is provided. The lighting device includes: a light-transmissive plate having an entrance surface; and an image projecting device that irradiates the entrance surface of the light-transmissive plate with image light. The image light passing through the light-transmissive plate is projected on an object. The image light emitted by the image projecting device includes light in a first wavelength range and light in a second wavelength range. Here, the light in the second wavelength range is longer in wavelength than the light in the first wavelength range. The light-transmissive plate absorbs or scatters the light in the first wavelength range more than the light in the second wavelength range.

13 Claims, 5 Drawing Sheets

(58) Field of Classification Search
CPC .................. F21S 8/006; F21Y 2101/00; E04D 2013/0345; F21W 2121/008
See application file for complete search history.

(56) References Cited

U.S. PATENT DOCUMENTS

| | | |
|---|---|---|
| 2005/0122308 A1* | 6/2005 | Bell ........................ G06F 3/011 345/156 |
| 2011/0002035 A1 | 1/2011 | Okamoto |
| 2013/0100174 A1 | 4/2013 | Yamada et al. |
| 2015/0077966 A1 | 3/2015 | Bessho et al. |
| 2016/0191868 A1* | 6/2016 | Fujiune .................. H04N 9/315 348/759 |
| 2017/0051893 A1 | 2/2017 | Di Trapani |
| 2017/0153021 A1* | 6/2017 | Di Trapani ......... F21V 33/0092 |

FOREIGN PATENT DOCUMENTS

| | | |
|---|---|---|
| JP | 2011-013537 | 1/2011 |
| JP | 2013-092616 | 5/2013 |
| JP | 2015-207554 | 11/2015 |
| WO | 2005/057921 | 6/2005 |
| WO | 2013/154133 | 10/2013 |

* cited by examiner

LIGHTING DEVICE

CROSS REFERENCE TO RELATED APPLICATION

This application claims the benefit of priority of Japanese Patent Application Number 2016-168606 filed on Aug. 30, 2016, the entire content of which is hereby incorporated, by reference.

BACKGROUND

1. Technical Field

The present disclosure relates to a lighting device.

2. Description of the Related Art

Conventionally, a lighting device including a liquid crystal panel that emits image light, a liquid crystal display device that displays an image, and an image generation means that generates an image is disclosed (see Japanese Unexamined Patent Application Publication No. 2013-92616 (Patent Literature (PTL) 1), for example).

This lighting device creates a lighting environment into which light streams, by the liquid crystal display device displaying an image.

SUMMARY

With the lighting device disclosed in PTL 1, however, the same image as that generated by an image projecting device is projected on an object when the object is irradiated with light exiting through a light-transmissive plate. For example, usually, in an environment where light streams through a window, a shadow of light filtering through trees, for example, is reflected in the window, but the shadow reflected in the object is blurry. Thus, the conventional lighting device does not provide illumination that imitates the natural light, and cannot provide a lighting environment resembling the natural environment.

In view of this, it is an object of the present disclosure to provide a lighting device that reproduces a lighting environment resembling the natural environment.

In order to achieve the above object, a lighting device according to an aspect of the present disclosure includes: a light-transmissive plate having an entrance surface; and an image projecting device that irradiates the entrance surface of the light-transmissive plate with image light, the image light passing through the light-transmissive plate and being projected on an object. The image light emitted by the image projecting device includes light in a first wavelength range and light in a second wavelength range. Here, the light in the second wavelength range is longer in wavelength than the light in the first wavelength range. The light-transmissive plate absorbs or scatters the light in the first wavelength range more than the light in the second wavelength range.

According to the present disclosure, it is possible to reproduce a lighting environment resembling the natural environment.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Hereinafter, embodiments of the present disclosure will be described with reference to the drawings. The embodiments described below illustrate specific examples of the present disclosure. Thus, the numerical values, shapes, materials, structural elements, the arrangement and connection of the structural elements, etc., presented in the embodiments below are mere examples and do not limit the present disclosure. As such, among the structural elements in the embodiments below, structural elements not recited in any one of the independent claims indicating the broadest inventive concepts will be described as arbitrary structural elements.

Furthermore, the term "approximately ..." is intended to encompass, in an example case of "approximately identical", not only what is exactly identical but also what can be recognized as substantially identical.

Note that each drawing is a schematic illustration and is not necessarily a precise illustration. Further, essentially the same structural elements are given the same reference signs in the figures, and overlapping descriptions thereof will be omitted or simplified.

Embodiment 1

Hereinafter, lighting device 1 according to Embodiment 1 of the present disclosure will be described.

[Configuration]

First, the configuration of lighting device 1 according to the present embodiment will be described with reference to FIG. 1 to FIG. 5.

Figure 1:
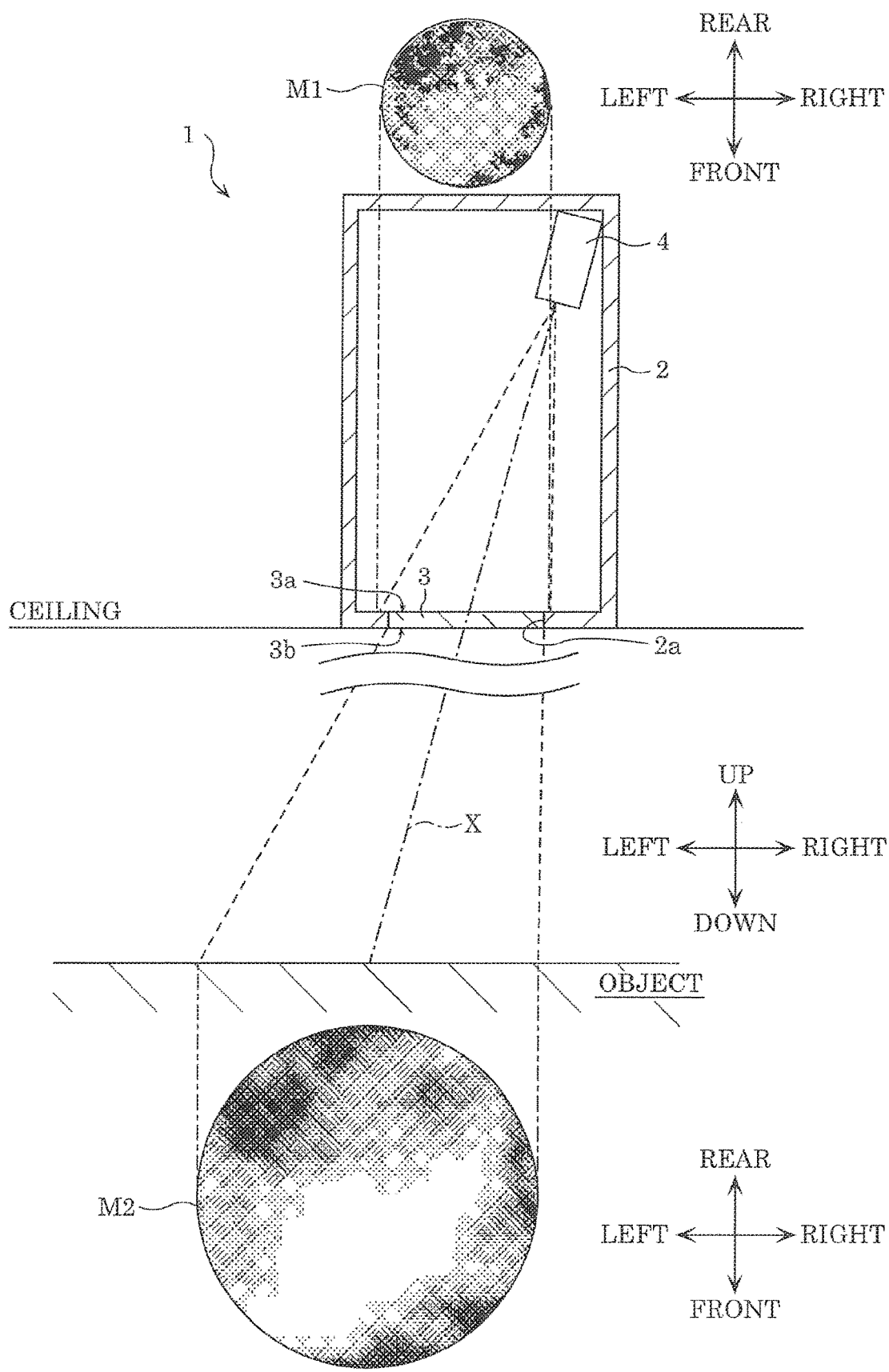
FIG. 1 is a schematic cross sectional view of a lighting device according to Embodiment 1, as well as a conceptual diagram illustrating an image formed by image light emitted to a light-transmissive plate, and an image projected on an object.
Figure 2:
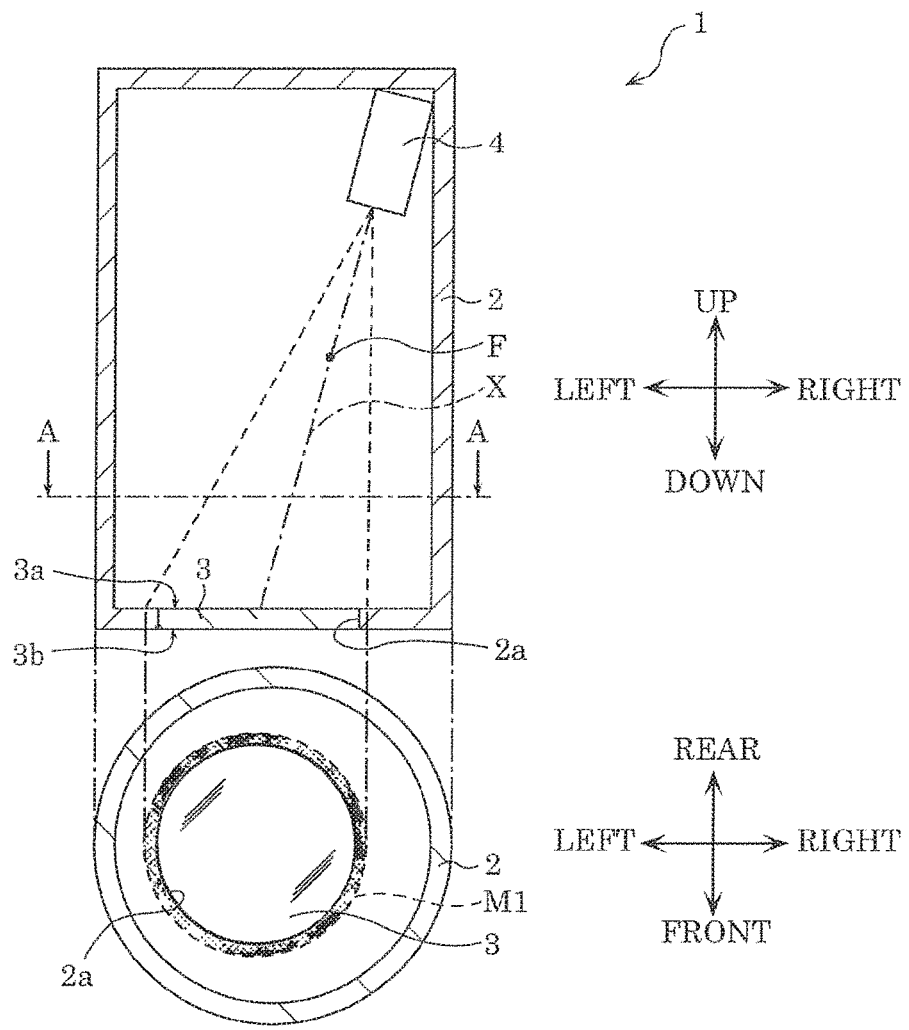
FIG. 2 is a schematic cross sectional view of the lighting device according to Embodiment 1, as well as a schematic cross sectional view of the lighting device cut along line A-A.
Figure 3:
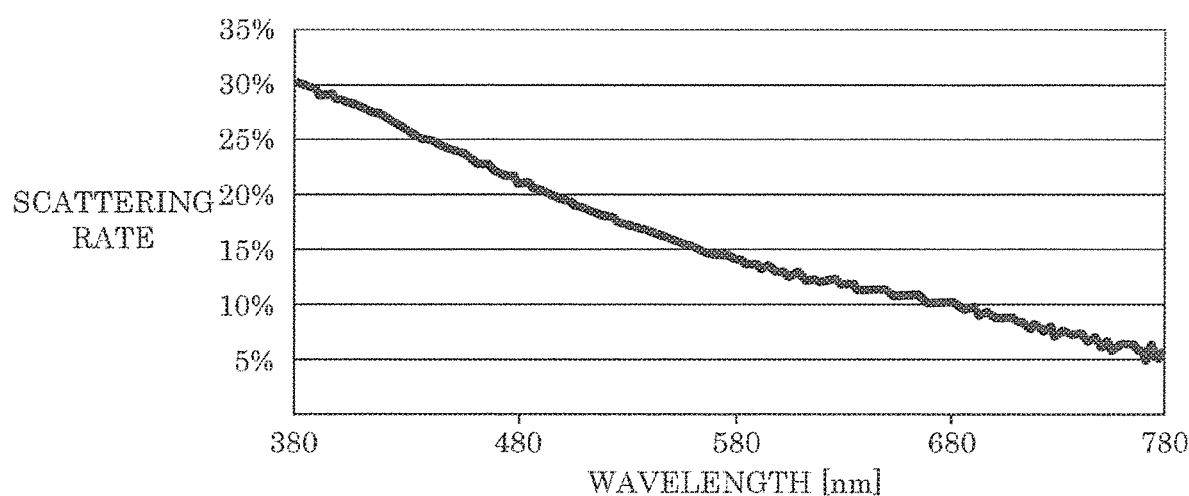
FIG. 3 is a graph illustrating a relationship between the wavelength and the scattering rate of image light that scatters when passing through the light-transmissive plate of the lighting device according to Embodiment 1.
Figure 4:
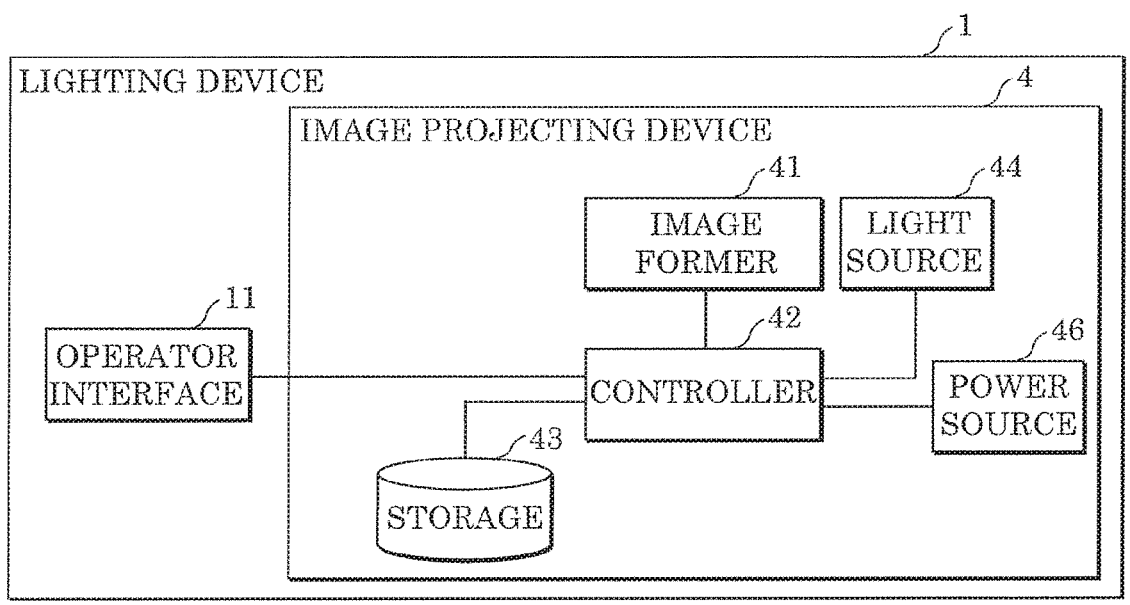
FIG. 4 is a block diagram illustrating the lighting device according to Embodiment 1.
Figure 5:
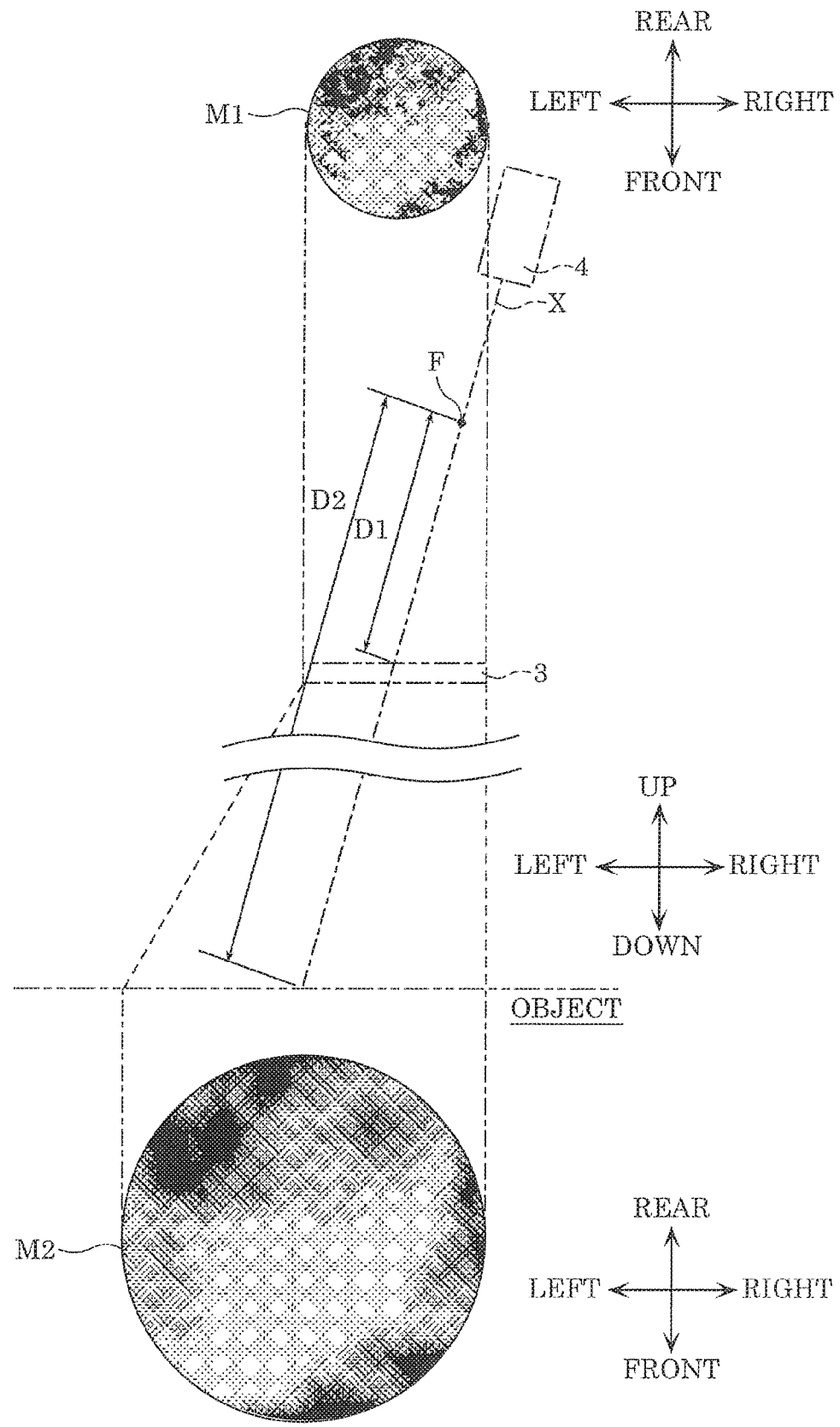
FIG. 5 is a schematic view illustrating a relationship among an image projecting device, a focal point, the light-transmissive plate, and the object of the lighting device, as well as a conceptual diagram illustrating an image formed by image light emitted to the light-transmissive plate, and an image projected on the object.

FIG. 1 is a schematic cross sectional view of lighting device 1 according to the present embodiment, as well as a conceptual diagram illustrating image M1 formed by image light emitted to light-transmissive plate 3, and image M2 projected on an object. FIG. 2 is a schematic cross sectional view of lighting device 1 according to the present embodiment, as well as a schematic cross sectional view of lighting device 1 cut along line A-A. FIG. 3 is a graph illustrating a relationship between the wavelength and the scattering rate of image light that scatters when passing through light-transmissive plate 3 of lighting device 1 according to the present embodiment. FIG. 4 is a block diagram illustrating lighting device 1 according to the present embodiment. FIG. 5 is a schematic view illustrating a relationship among image projecting device 4, focal point F, light-transmissive plate 3, and the object of lighting device 1 according to the present embodiment, as well as a conceptual diagram illustrating an image formed by image light emitted to light-transmissive plate 3, and an image projected on the object. Note that in FIG. 1 and FIG. 5, because the image light passes through light-transmissive plate 3, image M1 formed on light-transmissive plate 3 by the image light does not appear exactly like image M1; FIG. 1 and FIG. 5 are conceptual diagrams illustrating how image M1 would appear if image M1 were reflected in light-transmissive plate 3. FIG. 2 illustrates image M1 reflected in the vicinity of opening 2a and the image light passing through light-transmissive plate 3.

FIG. 1 shows the up-down direction, the left-right direction, and the front-rear direction of lighting device 1, where the up direction indicates a direction toward image projecting device 4. The directions shown in FIG. 2 and subsequent figures all correspond to the directions shown in FIG. 1. Note that the up-down direction, the left-right direction, and the front-rear direction are not limited to those shown in FIG. 1 because they change depending on usage. The same applies to the subsequent figures.

As illustrated in FIG. 1 and FIG. 2, lighting device 1 is capable of reproducing illumination that imitates the natural light, and providing illumination with a shadow having a motion. The light imitating the natural environment specifically refers to light that reproduces, for example, a blue sky, the sunlight, and light with a shadow at the same time. Lighting device 1 is embedded in a wall or a ceiling of a room, for example. Lighting device 1 includes operator interface 11 shown in FIG. 4, and can select, via operator interface 11, the color and/or the brightness of the image light that image projecting device 4 projects the object, the type of the image, etc. Operator interface 11 may be an operation panel electrically connected to lighting device 1, or may be a remote control operable by wireless communication. The object is a floor or a wall, for example, and is a body irradiated with the image light. The image light is light that includes an image, and is mainly in a visible light range from 380 nm to 780 nm. When the image light is projected on the object, image M2 is reflected in the object. The image light is light having a bright portion and a dark portion (a shadow) or is approximately uniform light, and is, for example, light filtering through trees. The image included in the image light is different from a full-color image displayed on TV, for example.

Lighting device 1 includes housing 2, light-transmissive plate 3, and image projecting device 4.

Housing 2 is a bottomed boxlike component having opening 2a on the lower side, and houses image projecting device 4 inside. Housing 2 is fixed to the ceiling in a manner that light-transmissive plate 3 is exposed from the ceiling. In the present embodiment, housing 2 has a shape of a cylinder supported by the ceiling so as to extend in the up-down direction. Note that housing 2 is not a compulsory structural element if light-transmissive plate 3 and image projecting device 4 are installed in equipment such as a wall or a ceiling so that the functions of lighting device 1 can be performed.

As illustrated in FIG. 1 and FIG. 2, light-transmissive plate 3 is a light-transmissive component having a plate shape, and is fixed to housing 2 so as to block opening 2a of housing 2. In the present embodiment, light-transmissive plate 3 has a disc shape; however, its shape can be changed as appropriate according to the shape of opening 2a. That is to say, in a plan view, light-transmissive plate 3 may have a polygonal shape, an elliptical shape, or a shape combining these shapes.

Light-transmissive plate 3 has entrance surface 3a and exit surface 3b.

Entrance surface 3a is a surface through which the image light emitted from image projecting device 4 enters. Entrance surface 3a is disposed inside housing 2 and is the upper surface of light missive plate 3. In the present embodiment, when the lower surface inside housing 2 including entrance surface 3a is irradiated with the image light, image M1 as illustrated in FIG. 1 is reflected. Image projecting device 4 irradiates at least the entirety of entrance surface 3a of light-transmissive plate 3 with the image light. In the present embodiment, image projecting device 4 irradiates light-transmissive plate 3 and a peripheral region of opening 2a of housing 2 with the image light. With this, the image light is not blocked unnaturally at an edge portion of light-transmissive plate 3, and thus the edge portion of light-transmissive plate 3 is less likely to appear dark. The edge portion of light-transmissive plate 3 is a portion of the peripheral region of light-transmissive plate 3. The user is less likely to feel strange even when the user sees the image light exiting through exit surface 3b of light-transmissive plate 3 or image M2 projected on the object.

Exit surface 3b is the lower surface of light-transmissive plate 3 opposite entrance surface 3a, and is exposed from opening 2a of housing 2. Exit surface 3b is a surface through which the image light entering through entrance surface 3a exits.

Light-transmissive plate 3 is formed from a light-transmissive resin material such as acrylic or polycarbonate, or a light-transmissive material such as a transparent glass material. Light-transmissive plate 3 has a property to absorb or scatter image light having a given wavelength component included in the image light of a wavelength of at least 380 nm and at most 550 nm that is a wavelength range including blue light. In the present embodiment, a Rayleigh diffuser plate that brings about Rayleigh scattering in the entering image light is used as an example of light-transmissive plate 3.

Light-transmissive plate 3 is a component which contains, as a base material, a light-transmissive resin such as acrylic, and in which a diffuser material such as a nanocomposite material is dispersed. The nanocomposite material is, for example, silica or a metal oxide such as a titanium oxide, a zinc oxide, or a zirconia oxide. When the particle size of the nanocomposite material is sufficiently small as compared to the light wavelength, Rayleigh scattering occurs in the light entering light-transmissive plate 3.

Since light-transmissive plate 3 is a component in which the nanocomposite material is dispersed, light-transmissive plate 3 has a property to absorb or scatter light in a later-described first wavelength range more than light in a later-described second wavelength range.

Image projecting device 4 irradiates entrance surface 3a of light-transmissive plate 3 with the image light, and the image light passing through light-transmissive plate 3 is projected on the object. When image projecting device 4 irradiates light-transmissive plate 3 with the image light, the image light passes through light-transmissive plate 3 and is projected on the object disposed beyond light-transmissive plate 3, and image M2 is thereby reflected. Image M2 is more blurry than image M1 because image M2 is image M1 being projected on the object after passing through light-transmissive plate 3.

Image projecting device 4 is disposed at the bottom portion of housing 2 (the upper side of housing 2) to irradiate the entirety of entrance surface 3a of light-transmissive plate 3 with the image light. Image projecting device 4 is disposed in a manner that optical axis X of the image light intersects with light-transmissive plate 3. More specifically, image projecting device 4 is disposed in housing 2 in a manner that optical axis X of the image light and a normal line of exit surface 3b form an angle greater than 0° and less than 90°. In other words, image projecting device 4 irradiates entrance surface 3a with the image light having optical axis X inclined with respect to the normal line of entrance surface 3a. Image M1 formed by the image light with which light-transmissive plate 3 is irradiated by image projecting device 4 may be a still image or may be a moving image that changes temporally.

As illustrated in FIG. 2, image projecting device 4 emits the image light to form focal point F between image projecting device 4 and light-transmissive plate 3 when light-transmissive plate 3 is irradiated with the image light. That is to say, light emitted by later-described light source 44 becomes the image light via later-described image former 41, and forms focal point. F between image projecting device 4 and light-transmissive plate 3. The position of focal point F in the present embodiment is an example, and is not limited to the position illustrated in FIG. 2.

The image light emitted by image projecting device 4 includes image light in a first wavelength range and image light in a second wavelength range. The image light in the second wavelength is longer in wavelength than the image light in the first wavelength range. As illustrated in FIG. 3, the scattering rate of the image light passing through light-transmissive plate 3 decreases as the wavelength of the image light increases. The image light in the first wavelength range, which is shorter in wavelength than the image light in the second wavelength range, is more easily absorbed or scattered by a diffusing material included in light-transmissive plate 3 than the image light in the second wavelength range, when passing through light-transmissive plate 3. In contrast, the image light in the second wavelength range, which is longer in wavelength than the image light in the first wavelength range, more easily passes through light-transmissive plate 3 in an approximately straight line than the image light in the first wavelength range. The image light in the second wavelength range is light that remains of the image light emitted by image projecting device 4 when the image light in the first wavelength range is excluded. Note that the image light in the first wavelength range may be light including blue light in a range from approximately 380 nm to approximately 550 nm, for example, whereas the image light in the second wavelength range may be light in a range from approximately 550 nm to approximately 780 nm, for example.

As illustrated in FIG. 4, image projecting device 4 includes image former 41, controller 42, storage 43, light source 44, power source 46, and a lens.

Image former 41 is a device through which image light corresponding to an image is emitted. As an example, image former 41 in the present embodiment is a light-transmissive liquid crystal panel etc., that displays an image; however, image former 41 is not limited to the liquid crystal panel that displays an image. Controller 42 causes image former 41 to display an image stored in storage 43. Storage 43 stores a plurality of image patterns. The light from light source 44 with which image former 41 is irradiated becomes the image light by passing through image former 41. Then, entrance surface 3a of light-transmissive plate 3 is irradiated with the image light.

Controller 42 may have a timer function to, for example, change the image light emitted to light-transmissive plate 3 at every predetermined time, or change the image light when a predetermined time elapses. For example, along with (in synchronization with) a lapse of time of a day according to a timer, image light that continuously changes from the dawn to the sunset in a day may be projected on the object via light-transmissive plate 3. The image light that changes in such a manner is stored in storage 43. Further, upon the user's arbitrary selection of an image, image light that gives the user the feeling as if the user is exposed to daytime sunlight even at night, for example, may be projected on the object via light-transmissive plate 3. Although the predetermined time is a time set in advance, it may be arbitrarily set by the user. Controller 42 may perform its operation using a microcomputer, a processor, or a dedicated circuit.

Controller 42 may control the lighting of light source 44 to cause a continuous change in the light color so that the color of the light emitted by light source 44 changes over time. Further, controller 42 may continuously change the image and the light color so that the directions of the light and the shadow (the direction of light as though the light is streaming through a window), which depend on changes in the directions of, for example, the sun, the moon, and the stars, change over time.

Controller 42 controls, via, for example, a driver circuit, the brightness of the light emitted by light source 44, to change at least one of the color temperature and the brightness of the image light with which light-transmissive plate 3 is irradiated. Controller 42 changes the color temperature of the image light such that the color temperature of the image light with which entrance surface 3a of light-transmissive plate 3 is irradiated is at least 9000 K and at most 15000 K. Controller 42 changes the color temperature of the image light such that the color temperature of the image light passing through light-transmissive plate 3 and projected on the object is at least 2700 K and at most 6500 K.

Storage 43 is a device that stores a control program executed by controller 42 in the case where controller 42 includes, for example, a processor or a microcomputer. Storage 43 is implemented by a semiconductor memory, for example. Storage 43 stores information related to an image projected by image projecting device 4.

Light source 44 is a light-emitting element as a light-emitting diode (LED), for example, and irradiates image former 41 that displays an image, with light. In the present embodiment, the light emitted by light source 44 is white light. Image projecting device 4 does not divide the optical path of the white light emitted by light source 44 into a plurality of optical paths according to the wavelengths of the white light, using, for example, a wavelength separation filter, or perform time division according to the wavelengths using, for example, a color wheel. Rather, image projecting device 4 irradiates image former 41 with the white light via the currently-used optical path and optical member, and irradiates light-transmissive plate 3 with the image light via image former 41.

Light source 44 is turned on and off by being controlled by the driver circuit included lighting device 1. Further, dimming control (brightness control) and toning control (light color control) for light source 44 are performed by the driver circuit controlling power source 46 (adjusting the power supply). The driver circuit is implemented by a microcomputer, a processor, or a dedicated circuit etc., that controls, for example, current supplied to light source 44, according to an input signal etc. Note that the driver circuit may be included in controller 42 or may be separate from controller 42.

Power source 46 is a circuit unit including a circuit board and a circuit component mounted on the circuit board, and supplies light source 44 with power for turning light source 44 on (causing bight source 44 to emit light). For example, power source 46 converts power supplied from a power system into direct-current power at a predetermined level through rectification, smoothing, and voltage drop etc., and supplies light source 44 with the direct-current power. Light source 44 emits light using the direct-current power supplied from a power source circuit.

The lens is light-transmissive, and has a function to form an image with the image light from image former 41.

With such lighting device 1, the image light is emitted from image projecting device 4 to light-transmissive plate 3 with a color temperature of at least 9000 K and at most 15000 K. The image light enters through entrance surface 3a of light-transmissive plate 3 and passes through light-transmissive plate 3. When the image light passes through light-transmissive plate 3, the diffusing material included in light-transmissive plate 3 absorbs or scatters at least one wavelength component in a range from 380 nm to at most 550 nm. The image light exiting through exit surface 3b is projected on the object with a color temperature of at least 2700 K and at most 6500 K. As a result, an image glowing blue like a blue sky is reflected in light-transmissive plate 3, and an image glowing yellow to reproduce the sunlight is reflected in the object.

As illustrated in FIG. 5, light-transmissive plate 3 located at distance D1 from focal point F along the optical axis of image projecting device 4 is closer to focal point F than the object is which is located at distance D2 from focal point F, and thus image M1 which is a little more blurry than the image at focal point F is reflected in light-transmissive plate 3. On the other hand, since the object is farther from focal point F than light-transmissive plate 3 is, image M2 which is more blurry than image M1 is reflected in the object. That is to say, the difference in blurriness between image M1 on light-transmissive plate 3 and image M2 on the object is determined by the distance between focal point F and each irradiated plane (light-transmissive plate 3 and the object).

[Advantageous Effects]

Next, advantageous effects of lighting device 1 according to the present embodiment will be described.

As described above, lighting device 1 according to the present embodiment includes: light-transmissive plate 3 having entrance surface 3a; and image projecting device 4 that irradiates entrance surface 3a of light-transmissive plate 3 with image light. The image light passes through light-transmissive plate 3 and is projected on an object. The image light emitted by image projecting device 4 includes light in a first wavelength range and light in a second wavelength range. Here, the light in the second wavelength range is longer in wavelength than the light in the first wavelength range. Light-transmissive plate 3 absorbs or scatters the light in the first wavelength range more than the light in the second wavelength range.

According to this configuration, light-transmissive plate 3 scatters the light in the first wavelength range (high color temperature) more than the light in the second wavelength range (low color temperature) and allows the light in the second wavelength range to pass through straight, and thus, for example, an image from light having a high color temperature and glowing blue is reflected in light-transmissive plate 3, and image light having a low color temperature illuminates the object as though the direct sunlight illuminates the object. Therefore, different environmental factors of a blue sky and the sunlight can be reproduced at the same time using single lighting device 1.

Thus, with lighting device 1, it is possible to reproduce a lighting environment resembling the natural environment.

Furthermore, with lighting device 1 according to the present embodiment, the light in the first wavelength range is image light in the first wavelength range with which light-transmissive plate 3 is irradiated, and the light in the second wavelength range is image light in the second wavelength range with which light-transmissive plate 3 is irradiated.

According to tins configuration, light-transmissive plate 3 scatters the light in the first wavelength range more than the light in the second wavelength range (low color temperature) and allows the light in the second wavelength range to pass through straight, and thus an image from light glowing blue is reflected in light-transmissive plate 3, and image light having a low color temperature illuminates the object as though the direct sunlight illuminates the object. That is to say, different environmental factors of a blue sky and the sunlight can be reproduced at the same time using single lighting device 1. Thus, lighting device 1 makes it possible to achieve illumination that further imitates the natural environment.

Furthermore, with lighting device 1 according to the present embodiment, image projecting device 4 includes: light source 44 that emits white light; and no more than one image former 41 which the white light enters from light source 44. The image light exits from image former 41.

According to this configuration, by simply using image projecting device 4 including light source 44 and image former 41, it is possible to achieve illumination that imitates the natural light without a projector. That is to say, it is unnecessary to use a color separating optical system (an optical system that, like a 3LCD system, divides the optical path of white light emitted by a light source into optical paths different depending on RGB, and that, like a single-chip DLP system, temporally divides RGB using a color wheel) used for generating a full-color image as in the case of a common projector. Thus, image projecting device 4 does not divide the optical path of the white light emitted by light source 44 into a plurality of optical paths according to the wavelengths of the white light or perform time division according to the wavelengths using, for example, a color wheel. Rather, image projecting device 4 irradiates image former 41 with the white light via the currently-used optical path and optical member. As a result, it is possible to simplify the optical system as compared to the common projector, by using, as the optical system constituting the optical path between light source 44 and image former 41, an optical system that allows the white light emitted from light source 44 to reach image former 41 without performing wavelength-dependent control on the white light. Thus, image projecting device 4 can reproduce the natural light by creating an image having a bright portion and a dark portion, rather than an image like a full-color image. As such, since lighting device 1 can achieve illumination that imitates the natural light with a simple configuration as compared to the case of using a projector, it is possible to reduce the size and the weight of lighting device 1 and inhibit a rise in the manufacturing cost.

Furthermore, with lighting device 1 according to the present embodiment, focal point F is formed between image projecting device 4 and light-transmissive plate 3 when image projecting device 4 irradiates light-transmissive plate 3 with the image light.

According to this configuration, providing focal point F of the image light between light source 44 and light-transmissive plate 3 makes distance D1 between focal point F and light-transmissive plate 3 shorter than distance D2 between focal point F and the object on which an image is projected. As a result, image M1 formed on entrance surface 3a of light-transmissive plate 3 has less blurriness than image M2 projected on the object. That is to say, the image becomes more blurry as the distance between the image and focal point F increases. This is a property of shadows created by the natural light. Lighting device 1 can reproduce the phenomenon (a property of shadows created by the natural light) that the blurriness of a shadow decreases with a decrease in distance between the substance that forms a shadow (a branch of a free, for example) and the plane (object) on which the shadow is projected, and the blurriness of the shadow increases with an increase in the distance between the substance and the plane. Thus, with lighting device 1, it is possible to achieve illumination that further imitates the natural light.

In particular, with lighting device 1, focal point F is formed between image projecting device 4 and light-transmissive plate 3, and thus more blurry image M2 is easily projected on the object.

Furthermore, with lighting device 1 according to the present embodiment, image projecting device 4 irradiates at least the entirety of entrance surface 3a of light-transmissive plate 3 with the image light.

According to this configuration, for example, the image light is not blocked unnaturally at an edge portion of light-transmissive plate 3, and thus the edge portion of light-transmissive plate 3 is less likely to appear dark. Therefore, the user does not easily feel strange even when the user sees the image light exiting through exit surface 3b of light-transmissive plate 3 or image M2 projected on the object.

Furthermore, with lighting device 1 according to the present embodiment, image projecting device 4 changes at least one of the color temperature and the brightness of the image light.

According to this configuration, the light streaming through light-transmissive plate 3 can be changed in a similar manner to how the brightness and the color of the natural light streaming through a window into a room change according to the season, time, and/or weather, for example.

Furthermore, with lighting device 1 according to the present embodiment, the color temperature of the image light with which image projecting device 4 irradiates entrance surface 3a is at least 9000 K and at most 15000 K. The color temperature of the image light passing through light-transmissive plate 3 and projected on the object by image projecting device 4 is at least 2700 K and at most 6500 K.

According to this configuration, exit surface 3b of light-transmissive plate 3 appears pale blue and image M2 projected on the object appears yellowish, and it is thus possible to achieve illumination that further imitates the natural light.

Furthermore, with lighting device 1 according to the present embodiment, light-transmissive plate 3 absorbs or scatters at least one wavelength component in a range from 380 nm to 550 nm.

According to this configuration, at least one wavelength component in a range from 380 nm to 550 nm, that is, a wavelength range including blue light, is absorbed or scattered, and thus exit surface 3b of light-transmissive plate 3 appears pale blue and the image light projected on the object is less likely to appear pale blue. Therefore, it is possible to achieve illumination that further imitates the natural light.

Furthermore, with lighting device 1 according to the present embodiment, image projecting device 4 irradiates entrance surface 3a with the image light having optical axis X inclined with respect to a normal line of entrance surface 3a.

According to this configuration, the object is mainly irradiated with oblique light when the natural light enters through a window, for example. Thus, lighting device 1 enables rendering as though light is streaming through a window onto the object.

Furthermore, with lighting device 1 according to the present embodiment, the image light emitted by image projecting device 4 includes a moving image that changes temporally.

According to this configuration, it is possible to reproduce a lighting environment with a high degree of flexibility according to the user's preferences. For example, by giving a motion to a shadow, it is possible to reproduce a situation where a wind blows, for example.

Variation of Embodiment 1

Hereinafter, lighting device 1 according to the present variation of Embodiment 1 will be described.

[Configuration]

Hereinafter, the configuration of lighting device 1 according to the present variation of Embodiment 1 will be described.

The present variation of Embodiment 1 is different from Embodiment 1 in that while the image light with which light-transmissive plate 3 is irradiated in Embodiment 1 includes the image light in the first wavelength range and the image light in the second wavelength range, the image light, with which light-transmissive plate 3 is irradiated in the present variation of Embodiment 1 includes light in the first wavelength range and the image light in the second wavelength range.

The other elements of lighting device 1 in the present variation of Embodiment 1 are the same as those of lighting device 1 in Embodiment 1; identical reference signs are given to identical elements, and detailed descriptions of such elements will be omitted.

Image projecting device 4 includes two image formers 41 and three wavelength separators (not illustrated) apart from controller 42, storage 43, light source 44, and power source 46.

Each wavelength separator is, for example, a dichroic mirror, a color wheel, etc., and separates the white light emitted by light source 44 into three colors, namely, red light (R), green light (G), and blue light (B). Among the light of three colors separated, the red light is emitted to irradiate one image former 41, whereas the green light is emitted to irradiate the other image former 41. Image projecting device 4 collects the red image light and the green image light each passing through the corresponding image former 41 and the blue light with which none of image formers 41 is irradiated, so as to irradiate light transmissive plate 3 with the collected image light. Note that when collecting the red image light, the green image light, and the blue light, a condenser lens that efficiently collects the light of these colors may be used, or an LC light valve that modulates the Light of these colors may be used, for example. Note that cyan image light is formed from the green image light and the red image light. Here, the blue light is light having no image.

Note that image projecting device 4 may separate the white light of light source 44 into, rather than light of three colors, light of two colors, namely, the light in the first wavelength range and the light in the second wavelength range (light obtained by excluding the light in the first wavelength range (excluding light of the blue component, for example) from the white light). In this case, the white light from light source 44 may be separated into two colors by, for example, allowing the light in the first wavelength range to pass through an optical path that bypasses image former(s) 41 and the light in the second wavelength range to pass through an optical path that goes through image former (s) 41. Further, in the case where the white light of light source 44 is time-divided into two colors using the color wheel, (i) when one image former 41 is to be irradiated with the light in the first wavelength range, an image signal containing an image having no shadow may be formed by, for example, the other image former 41, and (ii) when one image former 41 is to be irradiated with the light in the second wavelength range, an image having a shadow may be reflected in, for example, the other image former 41.

Note that in the present variation of Embodiment 1, a white light source that emits white light is used as light source 44; however, each of a red light source, a green light source, and a blue light source may be used instead. In this case, the wavelength separators may be omitted.

[Advantageous Effects]

Next, advantageous effects of lighting device 1 in the present variation of Embodiment 1 will be described.

As described above, with lighting device 1 according to the present variation of Embodiment 1, image projecting device 4 includes: image former 41 corresponding to an image; and light source 44 that emits white light to allow the image light to exit from image former 41. Image former 41 is irradiated with the light in the second wavelength range obtained by excluding light of a blue wavelength component from the white light emitted by light source 44. Image light in the second wavelength range exits from image former 41, and light-transmissive plate 3 is irradiated with the light in the first wavelength range and the image light in the second wavelength range.

According to this configuration, image projecting device 4 emits the light in the first wavelength range and the image light in the second wavelength range different from each other in wavelength range, and thus an image having a shadow and formed on light-transmissive plate 3 can have a lower contrast than an image having a shadow and projected on the object (an image reproducing the sunlight and a shadow). As a result, it is possible to reproduce a lighting environment that further resembles the natural environment, not by unnecessarily increasing the contrast of the image having a shadow and reflected in light-transmissive plate 3 where a blue sky is formed, but by clearly showing image M2 of the sunlight on the object.

In particular, since the image light in the first wavelength range is shorter in wavelength that the image light in the second wavelength range, the image light in the first wavelength range is higher in energy than the image light in the second wavelength range. For this reason, when, of the white light emitted by light source 44, the light in the first wavelength range is emitted along an optical path that bypasses image former(s) 41 or when the light in the first wavelength range is temporally divided using, for example, a color wheel and passes through image former(s) 41, it is possible to suppress deterioration of image former(s) 41 attributable to the light in the first wavelength range, by allowing the light in the first wavelength range to pass through image former(s) 41 without forming an image having a shadow on image former(s) 41.

The other advantageous effects of lighting device 1 according to the present variation of Embodiment 1 are the same as those produced by lighting device 1 according to Embodiment 1.

Embodiment 2

Hereinafter, lighting device 100 according to the present embodiment will be described.

[Configuration]

The configuration of lighting device 100 according to the present embodiment will be described with reference to FIG. 6 and FIG. 7.

Figure 6:
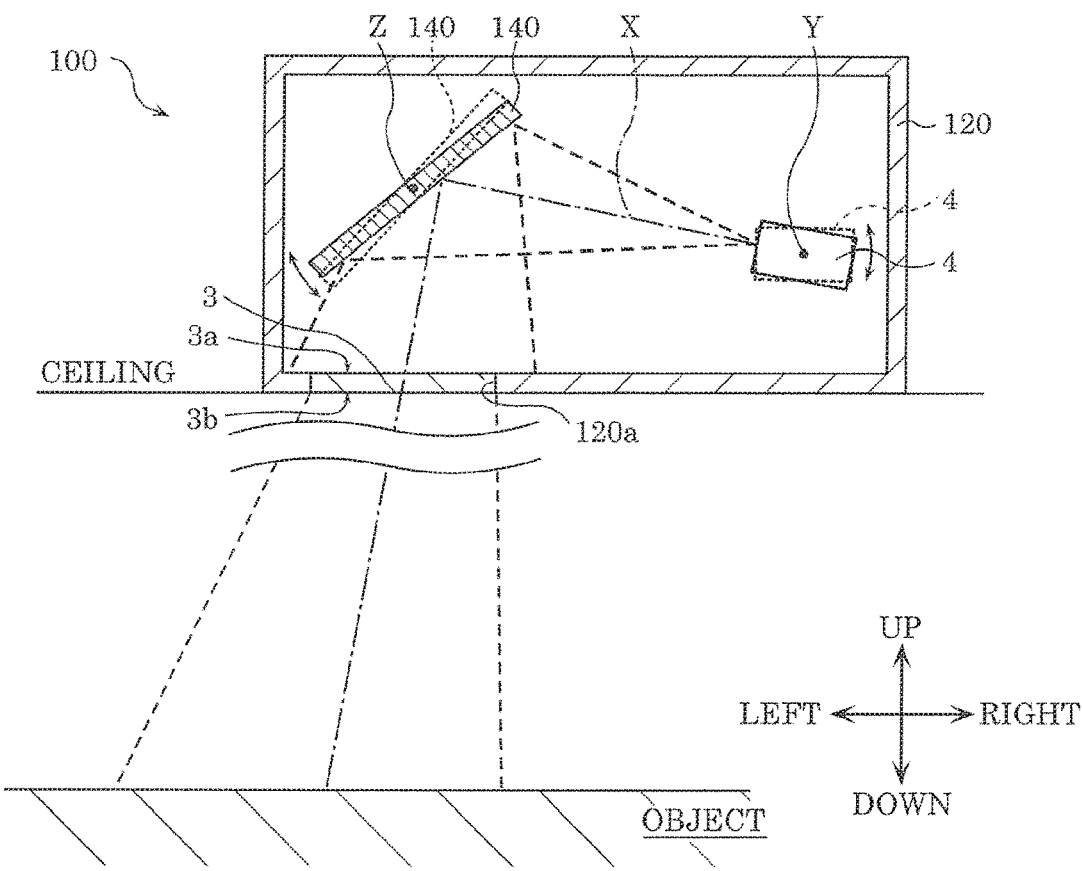
FIG. 6 is a schematic cross sectional view of a lighting device according to Embodiment 2.

FIG. 6 is a schematic cross sectional view of lighting device 100 according to the present embodiment. FIG. 7 is a block diagram illustrating lighting device 100 according to the present embodiment.

The present embodiment is different from Embodiment 1 in that image projecting device 4 in the present embodiment includes reflector plate 140 that oscillates and oscillator 130.

The other elements of lighting device 100 in the present embodiment are the same as those of lighting device 1 in Embodiment 1. Identical reference signs are given to identical elements, and detailed descriptions of such elements will be omitted.

Figure 7:
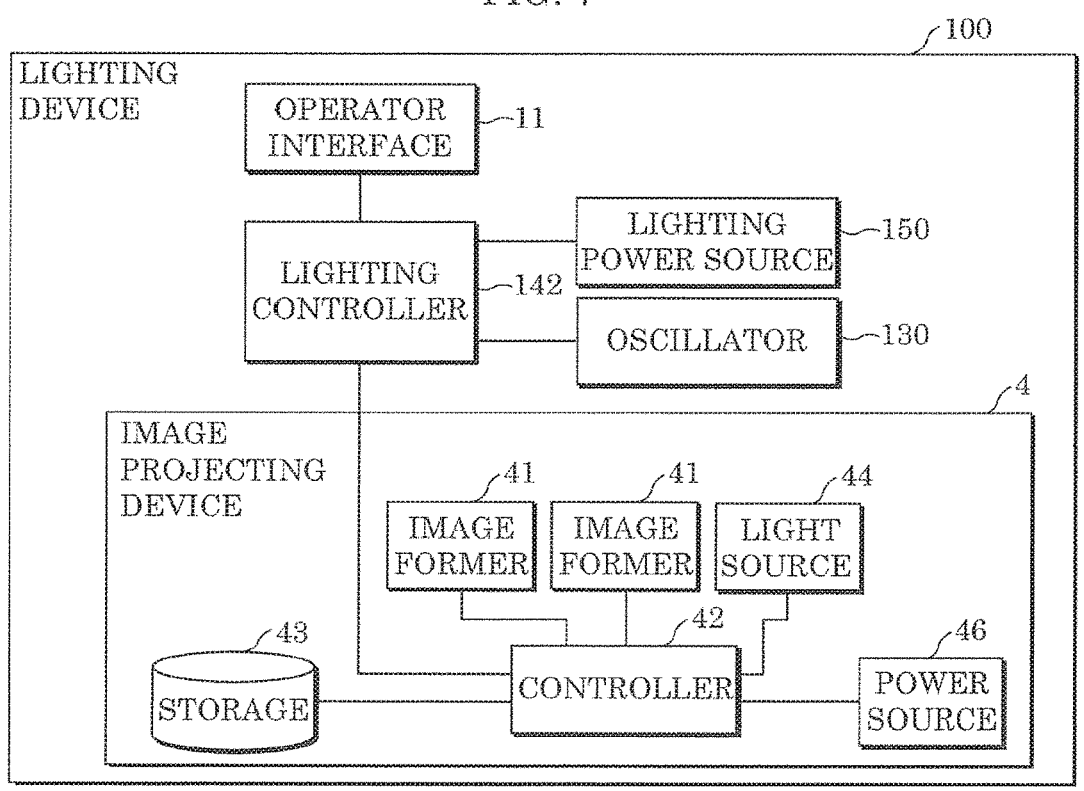
FIG. 7 is a block diagram illustrating the lighting device according to Embodiment 2.

As illustrated in FIG. 6 and FIG. 7, lighting device 100 includes oscillator 130 and reflector plate 140 apart from housing 120, light-transmissive plate 3, and image projecting device 4. Housing 120 according to the present embodiment is a boxlike component elongated in the left-right direction, and has light-transmissive plate 3 in opening 120a formed on the lower side.

Image projecting device 4 emits the image light toward reflector plate 140. Reflector plate 140 can oscillate around axis Z. Lighting device 100 is configured in a manner that the image light emitted from image projecting device 4 covers entrance surface 3a of light-transmissive plate 3 even when reflector plate 140 and image projecting device 4 oscillate.

Oscillator 130 is an actuator that oscillates reflector plate 140 around axis Z and image projecting device 4 around axis Y. Oscillator 130 oscillates reflector plate 140 and image projecting device 4 to change the angle formed between optical axis X of the image light reflected by reflector plate 140 and entrance surface 3a.

Reflector plate 140 is a mirror that reflects the image light emitted from image projecting device 4, and is disposed in housing 120 to allow light-transmissive plate 3 to be irradiated with the reflected image light. Reflector plate 140 can oscillate around axis Z. Note that, in the present embodiment, oscillator 130 oscillates reflector plate 140 around axis Z and oscillates image projecting device 4 around axis Y; however, reflector plate 140 may be fixed and image projecting device 4 may oscillate around axis Y, or image projecting device 4 may be fixed and reflector plate 140 may oscillate around axis Z.

The oscillation caused by oscillator 130 may be controlled by lighting controller 142. Lighting controller 142 controls the angular velocity, the oscillation amount, etc., at which image projecting device 4 and reflector plate 140 oscillate, by controlling power supplied from lighting power source 150. Lighting controller 142 has a timer function, and periodically oscillates image projecting device 4 and reflector plate 140 over time.

With such lighting device 100, the image light emitted from image projecting device 4 is reflected by reflector plate 140, and light-transmissive plate 3 is irradiated with the reflected image light. Oscillator 130 oscillates reflector plate 140 and image projecting device 4 to scan image M1 which is to be formed on light-transmissive plate 3. That is to say, a change in the angle formed between optical axis X of the image light reflected by reflector plate 140 and entrance surface 3a leads to a change in the direction of travel of the image light exiting from light-transmissive plate 3 (the direction of optical axis X of the image light reflected by reflector plate 140). Thus, the position of the image light projected on the object also changes over time.

Further, with such lighting device 1, the angle formed between optical axis X of the image light and entrance surface 3a of light-transmissive plate 3 is changed by, for example, lighting controller 142 causing reflector plate 140 to oscillate around axis Y via oscillator 130. In doing so, lighting controller 142 also gradually changes the color temperature of the image light with which light-transmissive plate 3 is irradiated. For example, the color temperature may be gradually decreased with an increase in the angle formed between optical axis X of the image light and entrance surface 3a of light-transmissive plate 3.

[Advantageous Effects]

Next, advantageous effects of lighting device 100 according to the present embodiment will be described.

As described above, lighting device 100 according to the present embodiment further includes oscillator 130 that oscillates image projecting device 4 to change the angle formed between optical axis X of the image light and entrance surface 3a.

According to this configuration, since oscillator 130 oscillates image projecting device 4, the position of the image light projected on the object also changes over time. Therefore, it is possible to reproduce changes in the natural light over time as though the position of light streaming through a window onto the object changes over time.

Furthermore, lighting device 100 according to the present embodiment further includes reflector plate 140 that reflects the image light to irradiate light-transmissive plate 3 with the image light. Oscillator 130 further oscillates reflector plate 140 to change the angle formed between optical axis of the image light reflected by reflector plate 140 and entrance surface 3a.

According to this configuration, since light-transmissive plate 3 is irradiated with the image light by image projecting device 4 via reflector plate 140, it is possible to narrow the region in which image projecting device 4 and reflector plate 140 are movable. As a result, as compared to the case where reflector plate 140 is not used as in Embodiment 1, it is unnecessary to take a long distance from image projecting device 4 to light transmissive plate 3, thereby making it possible to reduce the size of lighting device 100.

Furthermore, lighting device 100 according to the present embodiment changes the color temperature of the image light according to a change in the angle formed between optical axis X of the image light and entrance surface 3a.

According to this configuration, by emitting light while changing its color over time, it is possible to continuously change the light color as the time changes from the morning to the noon, the afternoon, and then to the evening, for example.

The other advantageous effects of lighting device 100 according to the present embodiment are the same as those produced by lighting device 1 according to Embodiment 1.

Other Variations, Etc.

Hereinbefore, the present disclosure has been described based on Embodiments 1 and 2 and the variation of Embodiment 1; however, the present disclosure is not limited to Embodiments 1 and 2 and the variation of Embodiment 1.

For example, in Embodiment 2 described above, the directions in which the reflector plate and the image projecting device oscillate are not limited to the direction around axis Z and the direction around axis Y. The reflector plate and the image projecting device may each move in the left-right direction, the up-down direction, and the front-rear direction. In this case, the lighting device may include a driving mechanism that causes the reflector plate and the image projecting device to move.

Further, in Embodiments 1 and 2 and the variation of Embodiment 1 described above, the interior of the housing of the lighting device may be black. In this case, the internal structure etc., of the housing is less visible via the light-transmissive plate, and thus the user's visibility is less likely to decrease.

Furthermore, in Embodiments 1 and 2 and the variation of Embodiment 1 described above, the image projected by the image projecting device is an image having a shadow; however, the image is not limited to an image having a shadow. It may be an image whose color changes temporally or an image including both a shadow portion and a colored portion.

In addition, in Embodiments 1 and 2 and the variation of Embodiment 1 described above, the image former may be a filter like a cutout, and may form a moving image by being oscillated by the oscillator.

Hereinbefore, one or more aspects of the present disclosure have been described based on Embodiments 1 and 2 and the variation of Embodiment 1; however, the present disclosure is not limited to Embodiments 1 and 2 and the variation of Embodiment 1. Various modifications to Embodiments 1 and 2 and the variation of Embodiment 1 conceived by those skilled in the art, as well as embodiments resulting from combinations of structural elements of different embodiments may be included within the scope of one or more aspects of the present disclosure, as long as such modifications and embodiments do not depart from the essence of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting device, comprising:
   a light-transmissive plate having an entrance surface; and
   an image projecting device that irradiates the entrance surface of the light-transmissive plate with image light, the image light passing through the light-transmissive plate and being projected on an object, the image projecting device including:
   an image former corresponding to an image; and a light source that emits white light to allow the image light to exit from the image former, wherein the image light emitted by the image projecting device includes light in a first wavelength range and light in a second wavelength range, the light in the second wavelength range being longer in wavelength than the light in the first wavelength range, the light-transmissive plate absorbs or scatters the light in the first wavelength range more than the light in the second wavelength range, the image former is irradiated with the light in the second wavelength range obtained by excluding light of a blue wavelength component from the white light emitted by the light source, image light in the second wavelength range exits from the image former, and the light-transmissive plate is irradiated with the light in the first wavelength range and the image light in the second wavelength range.

2. The lighting device according to claim 1, wherein the light in the first wavelength range is image light in the first wavelength range with which the light-transmissive plate is irradiated, and the light in the second wavelength range is image light in the second wavelength range with which the light-transmissive plate is irradiated.

3. The lighting device according to claim 1, wherein the image projecting device includes:

a light source that emits white light; and no more than one image former which the white light enters from the light source, and the image light exits from the image former.

4. The lighting device according to claim 1, wherein a focal point is formed between the image projecting device and the light-transmissive plate when the image projecting device irradiates the light-transmissive plate with the image light.

5. The lighting device according to claim 1, wherein the image projecting device irradiates at least an entirety of the entrance surface of the light-transmissive plate with the image light.

6. The lighting device according to claim 1, wherein the image projecting device changes at least one of a color temperature and a brightness of the image light.

7. The lighting device according to claim 1, wherein the light-transmissive plate absorbs or scatters at least one wavelength component in a range from 380 nm to 550 nm.

8. The lighting device according to claim 1, wherein the image projecting device irradiates the entrance surface with the image light having an optical axis inclined with respect to a normal line of the entrance surface.

9. The lighting device according to claim 8, further comprising:

an oscillator that oscillates the image projecting device to change an angle formed between the optical axis of the image light and the entrance surface.

10. The lighting device according to claim 1, wherein the image light emitted by the image projecting device includes a moving image that changes temporally.

11. A lighting device, comprising:

a light-transmissive plate having an entrance surface; and an image projecting device that irradiates the entrance surface of the light-transmissive plate with image light, the image light passing through the light-transmissive plate and being projected on an object, wherein the image light emitted by the image projecting device includes light in a first wavelength range and light in a second wavelength range, the light in the second wavelength range being longer in wavelength than the light in the first wavelength range, the light-transmissive plate absorbs or scatters the light in the first wavelength range more than the light in the second wavelength range, a color temperature of the image light with which the image projecting device irradiates the entrance surface is at least 9000 K and at most 15000 K, and the color temperature of the image light passing through the light-transmissive plate and projected on the object by the image projecting device is at least 2700 K and at most 6500 K.

12. A lighting device, comprising:

a light-transmissive plate having an entrance surface;

an image projecting device that irradiates the entrance surface of the light-transmissive plate with image light, the image light passing through the light-transmissive plate and being projected on an object;

a reflector plate that reflects the image light to irradiate the light-transmissive plate with the image light;

an oscillator that oscillates the image projecting device to change an angle formed between the optical axis of the image light and the entrance surface, wherein the image light emitted by the image projecting device includes light in a first wavelength range and light in a second wavelength range, the light in the second wavelength range being longer in wavelength than the light in the first wavelength range, the light-transmissive plate absorbs or scatters the light in the first wavelength range more than the light in the second wavelength range, the image projecting device irradiates the entrance surface with the image light having an optical axis inclined with respect to a normal line of the entrance surface, and the oscillator further oscillates the reflector plate to change the angle formed between the optical axis of the image light reflected by the reflector plate and the entrance surface.

13. A lighting device, comprising:

a light-transmissive plate having an entrance surface;

an image projecting device that irradiates the entrance surface of the light-transmissive plate with image light, the image light passing through the light-transmissive plate and being projected on an object; and an oscillator that oscillates the image projecting device to change an angle formed between the optical axis of the image light and the entrance surface, wherein the image light emitted by the image projecting device includes light in a first wavelength range and light in a second wavelength range, the light in the second wavelength range being longer in wavelength than the light in the first wavelength range, the light-transmissive plate absorbs or scatters the light in the first wavelength range more than the light in the second wavelength range, the image projecting device irradiates the entrance surface with the image light having an optical axis inclined with respect to a normal line of the entrance surface, and a color temperature of the image light is changed according to a change in the angle formed between the optical axis of the image light and the entrance surface.

\* \* \* \* \*